United States Patent [19]

Baker

[11] 4,194,975
[45] Mar. 25, 1980

[54] BACKWASH SYSTEM FOR SWIMMING POOL

[76] Inventor: Marvin E. Baker, 815 Ewing Ave., Nashville, Tenn. 37203

[21] Appl. No.: 1,414

[22] Filed: Jan. 8, 1979

[51] Int. Cl.² .................... E04H 3/20; B01D 23/26
[52] U.S. Cl. ........................... 210/108; 210/169; 210/411; 210/427
[58] Field of Search ............... 210/169, 82, 277, 333, 210/127, 128, 189, 191, 95, 275, 138, 98, 108, 411, 427; 4/172.17

[56] References Cited

U.S. PATENT DOCUMENTS

| Re. 25,865 | 9/1965 | Richards | 210/98 |
|---|---|---|---|
| 3,061,100 | 10/1962 | Fehlmann | 210/169 |
| 3,220,553 | 11/1965 | Growall et al. | 210/169 |
| 3,420,376 | 1/1969 | Smith | 210/169 X |
| 3,581,895 | 6/1971 | Howard | 210/169 |
| 3,672,791 | 6/1972 | Zimmerly | 210/169 |
| 3,688,908 | 9/1972 | Myers | 210/169 |
| 3,801,992 | 4/1974 | Sable | 4/172.17 |
| 3,834,537 | 9/1974 | Brett | 210/169 |
| 3,969,248 | 7/1976 | Whitmer | 210/169 |
| 3,994,807 | 11/1976 | Macklem | 210/169 |

Primary Examiner—Theodore A. Granger
Attorney, Agent, or Firm—Harrington A. Lackey

[57] ABSTRACT

A backwash system for a swimming pool including a pool discharge line and a return line and a filter, characterized by a forward pump in fluid communication between the pool discharge line and the filter and a reverse pump in the return line, and a strainer housing of unique construction in fluid communication between the forward pump and the pool discharge line. The strainer housing includes a strainer basket separating the strainer port from the pool discharge line and the strainer port communicating with the forward pump. A pressure-actuated valve operates within the strainer housing to open fluid communication between the pool discharge line and the strainer when the flow of liquid is in the forward direction and to close the strainer port to the pool discharge line when the flow of fluid is in the reverse direction. A waste line having a pivotal check valve is in communication with the strainer housing on the same side of the strainer basket as the pool discharge line, and the discharge check valve is adapted to be opened to discharge the contents of the strainer housing when the flow of liquid is in the reverse direction.

Control means are also provided for selectively actuating the forward and reverse pumps, whereby actuation of the reverse pump automatically backwashes the filter and backwashes the strainer within the strainer housing.

4 Claims, 7 Drawing Figures

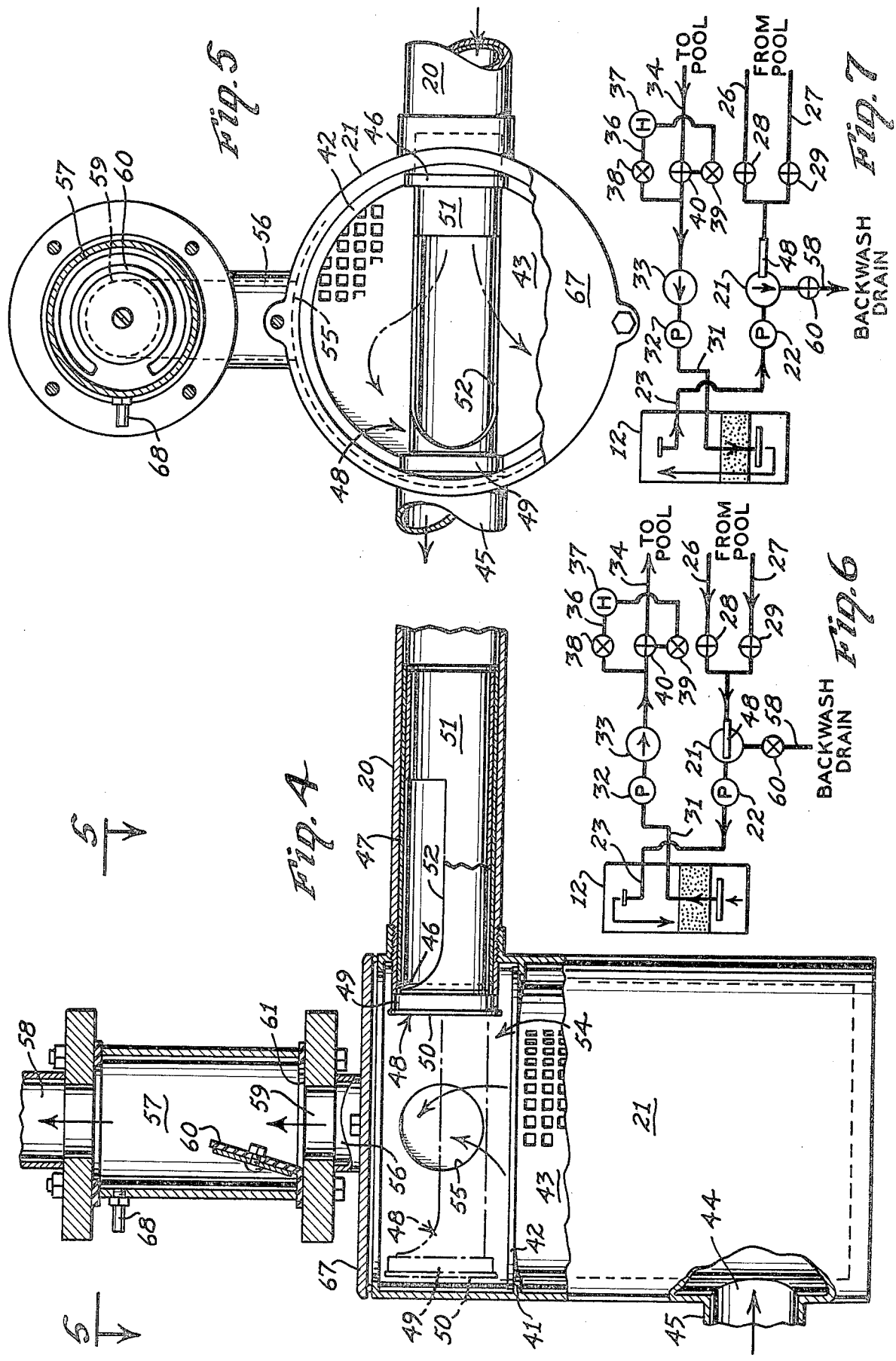

BACKWASH SYSTEM FOR SWIMMING POOL

BACKGROUND OF THE INVENTION

This invention relates to a filtration system for a swimming pool, and more particularly to a filtration backwashing system for a swimming pool.

Filtration systems for swimming pools including circulating means for backwashing the filtration system are well known in the art, as illustrated in the following U.S. Pat. Nos.:

3,061,100 Fehlmann—Oct. 30, 1962
3,220,553 Growall et al—Nov. 30, 1965
3,420,376 Smith—Jan. 7, 1969
3,581,895 Howard—June 1, 1971
3,801,992 Sable—Apr. 9, 1974

Fehlmann and Growall et al employ a single reversible pump and motor for reversing the circulation of swimming pool water through a filter media.

Richards U.S. Pat. No. 25,865, issued Sept. 21, 1965, discloses a backwashing system for backwashing filter beds and also for removing trash from a strainer basket, when the circulation of liquid is reversed.

SUMMARY OF THE INVENTION

It is an object of this invention to provide a backwash filtration system for a swimming pool in which the strainer basket protecting the main pump is backwashed and cleared of debris simultaneously with the backwashing of the filter.

It is also an object of this invention to provide a filtration backwash system for a swimming pool incorporating selectively operated forward and reverse pumps, in which the forward pump, when actuated, pumps liquid from the discharge line from the swimming pool through the strainer of the forward pump, the filter and back through the inoperative reverse pump in the return line to the pool. When the forward pump is de-energized, and the reverse pump is energized, the flow of liquid to and from the pool is reversed to backwash the filter and also to backwash the strainer basket protecting the forward pump.

The strainer basket is mounted in a uniquely constructed strainer housing including ports on opposite sides of the strainer basket connecting the pool discharge line and the intake of the forward pump. A waste line is also connected to the strainer housing on the same side of the strainer basket as the port communicating with the pool discharge line. The waste line includes a check valve adapted to be opened by the reverse flow of liquid through the system and adapted to be closed by its own weight and the weight of water on the discharge side of the check valve in the waste line when the circulation of the system is normally forward. A pressure-actuated valve is slidably mounted within the port of the strainer housing communicating with the pool discharge line so that the pressure-actuated valve is normally open when the liquid is flowing in the forward direction. The pressure-actuated valve is closed by the reverse flow of water to divert the flow of water carrying waste material from the filter media, as well as waste material from the strainer basket, out through the waste line, instead of back through the pool discharge line.

BRIEF DESCRIPTION OF THE DRAWINGS

FIG. 4 is an enlarged, fragmentary section taken along the line 4—4 of FIG. 3, with portions broken away;

FIG. 5 is a fragmentary section taken along the line 5—5 of FIG. 4, with portions broken away;

FIG. 6 is a schematic flow diagram of the system illustrating the water flowing in a normal forward direction; and FIG. 7 is a schematic flow diagram of the system illustrating the reverse flow of the water.

DESCRIPTION OF THE PREFERRED EMBODIMENTS

Figure 3:
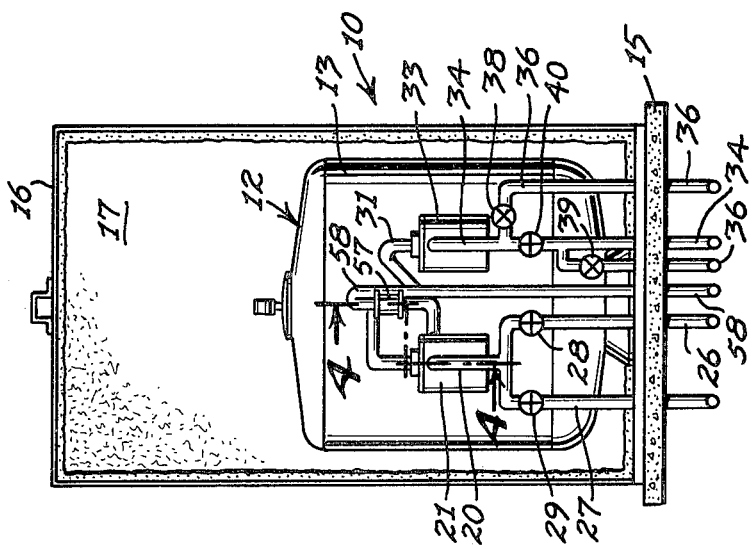
FIG. 3 is a right end elevation of the filtration system disclosed in FIG. 1.
Figure 2:
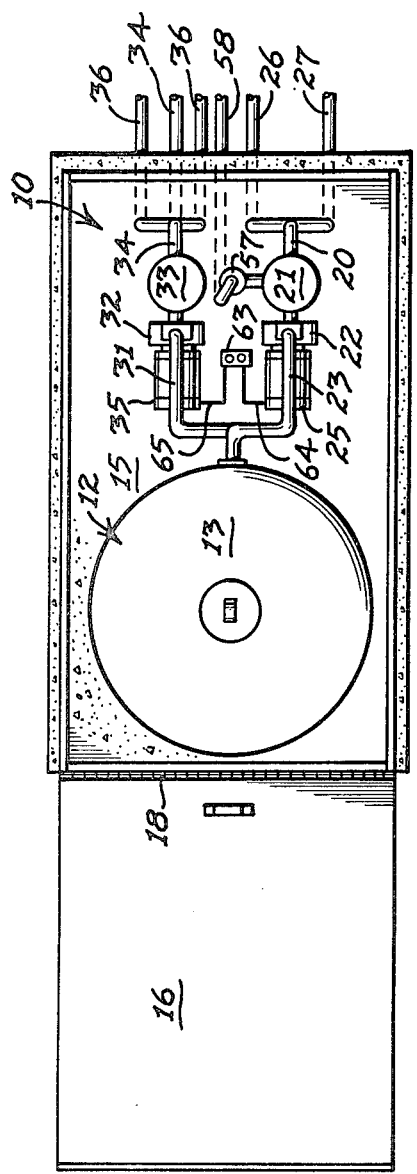
FIG. 2 is a top plan view of the filtration system disclosed in FIG. 1.
Figure 1:
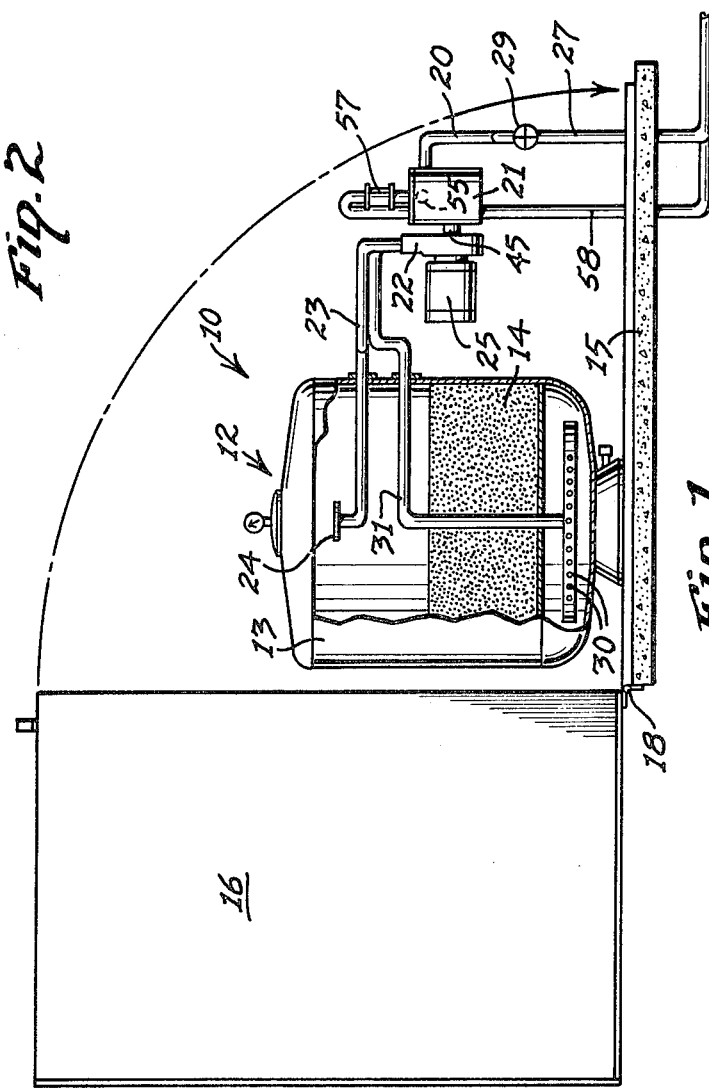
FIG. 1 is a side elevation of the filtration system for a swimming pool, made in accordance with this invention, with portions of the filter broken away.

Referring now to the drawings in more detail, and more particularly to FIGS. 1–3, the filtration system 10 made in accordance with this invention includes a filter 12 of conventional construction including a filter housing 13 within which is supported a filter media, such as sand 14. The filter 12 is disclosed mounted upon a concrete base 15. When the concrete base 15 is formed outdoors, a housing 16 having an insulated liner 17 may be hinged to the base 15 by hinges 18 for concealment and protection from the weather.

Liquid, specifically water, is normally pumped from the swimming pool, not shown, through a pool discharge line 20, forward pump strainer housing 21, forward, or main, pump 22, and a filter inlet line 23 into the filter housing 13 above the filter media 14 through inlet port 24. The forward pump 22 is driven by the forward pump motor 25. The pool discharge line 20 may have a pair of branch lines, including the main drain line 26 and the skimmer line 27, each of which may include a manual cutoff valve 28 and 29, respectively. After the water passes downward through the filter media 24 in the normal forward direction, it flows through the filter outlet ports 30 and filter outlet line 31 and through the reverse motor 32 in reverse direction. The water then flows in reverse through the reverse motor strainer housing 33 and through pool return line 34 as fresh clean water, back into the swimming pool, not shown. The reverse pump 33 is driven by a reverse pump motor 32.

Optionally connected to the pool return line 34 is a heater bypass line 36, including heater 37, bypass cutoff valves 38 and 39, and return line cutoff valve 40.

The forward strainer housing 21 is of a generally cylindrical shape having an annular inward projecting ledge 41 upon which rests the annular rim 42 of a conventional cylindrical strainer basket 43. A first or lower port 44 is connected to a fluid line or pipe 45 which is connected to the intake of the forward pump 22.

Formed in the upper side wall of the strainer housing 21 is a strainer port 46 threaded receiving the pool discharge line 20. Fitted within the discharge line 20 and the strainer port 46 is a sleeve liner 47 adapted to slidably receive a pressure-actuated slide valve 48. The slide valve 48 includes a valve head 49 having a pressure face 50 and a tubular and cylindrical slide element 51 slidably received within the sleeve liner 47. A discharge opening 52 is formed in the cylindrical wall of the slide element 51.

The slide valve 48 is adapted to move reciprocally between the solid-line, closed position disclosed in FIG. 4 and its phantom open position within the valve chamber 54 of the strainer housing 21, as illustrated in FIG. 4, and as illustrated in solid lines in FIG. 5. The slide valve 48 moves to its closed position when the pressure within the valve chamber 54 is greater than the pressure within the pool discharge line 20. When the pressure in the pool discharge line 20 is greater than the pressure within the valve chamber 54, then the slide valve 48 is moved to its open position.

Also formed in the side wall of the strainer housing 21 and communicating with the valve chamber 54 through the waste discharge port 55 is an L-shaped waste discharge conduit 56, with one leg directed upward and communicating with a check valve chamber 57 through a valve port 59 in the bottom end of the valve chamber 57. The vertical valve port 59 is adapted to be opened and closed by a check valve in the form of a hinged flap valve 60 adapted to be seated in closed position upon the annular valve seat 61 on top of the discharge port 59. When the flap valve 60 is open, water is discharged upward through valve chamber 57, and then through the "Harts Loop" of the waste line 58, then downward through the waste line 58 to drain.

Thus, when the pressure within the valve chamber 54 closes the slide valve 48 and exceeds the weight of water within the check valve chamber 57, the flap valve 60 is opened upward to permit the flow of water upward and out through the water line 58. Such flow occurs when the circulation of water through the filtration system 10 is in reverse, that is when the reverse pump 32 is energized and the forward pump 22 is de-energized.

Manual or automatic controls (FIG. 1) may be connected by appropriate electrical leads 64 and 65 to the respective forward and reverse motors 25 and 35, respectively.

In the operation of the filtration system 10, normally the controls 63 are actuated to energize the forward motor 25 in order to drive the forward pump 22, and to de-energize the reverse motor 35, thereby de-energizing or de-actuating the reverse pump 32.

When the forward pump 22 is actuated, water is drawn from the swimming pool through either or both of the branch lines 26 and 27 and the pool discharge line 20, causing the slide valve 42 to move to its open position disclosed in phantom in FIG. 4 and in solid lines in FIG. 5. The water then passes through slide valve opening 52 and forward strainer basket 43 for removal of trash. Accordingly trash-free water is introduced through the port 44 and intake line 45 into the forward pump 22. The water is then discharged from the pump 22 through the filter inlet line 23, inlet port 24 into the top of the filter housing 13, where the water circulates by gravity through the filter media 14, such as sand. The filtered water then enters the filter outlet ports 30, passes through the filter outlet line 31 and flows in reverse through the reverse motor 32 and strainer housing 33, where the clean water is returned to the swimming pool, not shown, through the pool return line 34. During normal operation the return line valve 40 is open, and the heater line valves 38 and 39 are closed. However, when it is desired to heat the water returned to the swimming pool, the main valve 40 is closed and both cutoff valves 38 and 39 are opened, and the heater 37 is energized.

When it is desired to backwash the pool water, the forward motor 25 is de-energized and the reverse motor 35 is energized to cut off the forward pump 22 and to drive the reverse pump 33. The circulation of the water is then completely reversed, flowing from the pool through the return line 34, the reverse strainer housing 33, reverse motor 32, filter outlet line 31 and discharged into the filter housing 13 through the outlet ports 30 below the filter media 14. The water is then forced upward through the filter media 14 to clean the filter media 14. The dirty water then discharges from the filter housing 13 through the filter inlet port 24, filter inlet line 23 and in reverse through the idle forward pump 22. The dirty water then discharges in reverse through the forward pump intake line 45 into the bottom of the forward strainer housing 21. The upward force of the water entering the strainer port 44 then forces the larger debris upward from the strainer basket 43 into the valve chamber 54 and outward through the discharge port 55. Simultaneously, the upward flow of dirty water creates sufficient pressure against the pressure face 50 of the slide valve 48 to cause the slide valve 48 to move toward the right of FIG. 4 and to seat against the strainer port 46 to close the flow of liquid from the valve chamber 54 into the pool discharge line 20.

With the pool discharge line 20 now isolated, the dirty and polluted water is discharged through the discharge port 55, upward through the discharge conduit 56 to force open the flap valve 60, and continues upward through the valve chamber 57 into the waste line 58. The waste water then moves through the waste line 58 through the upper bend or "Harts Loop" of the waste line 58, as disclosed in FIGS. 1 and 3, and descends by gravity to a drain or other point of discharge, not shown.

It will be noted that as the water is circulated in reverse by the reverse pump 32, it not only backwashes the filter media 14 within the filter 12, but also backwashes the strainer basket 43 within the forward strainer housing 21, in order to remove leaves and other waste materials automatically from the straining housing 21.

Although the top of the strainer housing 21 can be opened for manual inspection and cleaning by removing the top or lid 67, such operation is far less frequent with the circulation system 10 made in accordance with this invention, since the strainer basket 43 is automatically cleaned by the backwashing circulation of the water.

It will also be noted that the construction of the slide valve 48 is such that the strainer port 46 is immediately closed at the wall of the strainer housing 21, as opposed to the employment of a check valve within the pool discharge line 20 remote from the strainer port 46. Thus the entire pool discharge line 20 is maintained in a state of cleanliness by its being closed at the strainer port 46.

The wall of the check valve chamber 57 above the flap valve is provided with an air vent 68 to prevent siphoning in the waste line 58 and the valve chamber 57.

The construction and location of the flap valve 60 permits ready opening by pressure and closing solely by the weight of the water above the flap valve 60, or by virtue of only the weight of the flap valve, without any additional springs or weight for its manipulation.

In actual experiments, it has been found that when other types of check valves than the flap valve 60 are employed with springs or weights to bias the check valve to a closed position, these springs and weights provide too much counter-pressure, and tend to close the check valve too soon. The result has been that trash, and particularly leaves, released from the strainer basket 43 by the reverse flow causes such leaves to stick upon the face of the check valve thereby preventing the check valve from completely seating after the pressure of the reverse waste flow has ceased. An improperly seated waste check valve permits enough air seepage into the forward flow of water to create pump-priming problems.

It has also been found that where the waste check valve is broadly in the form of ball valves, that is having translating movement toward and away from the valve port, without any swinging or hinging action, leaves also tend to adhere to the face of the ball check valve.

Accordingly, it is important to have a check valve in the form of a hinged flap valve 60 which is mounted on top of a vertically disposed valve port, such as valve port 59, to permit only the weight of the water, plus the weight of the valve 60, to close the valve port 59. When the hinged flap valve 60 swings upward by virtue of the upward flow of waste water, any leaves or trash which might have a tendency to adhere to the face of the valve 60, would be immediately washed or swept off the face of the check valve 60 by virtue of its attitude substantially parallel to the reverse flow, as disclosed in FIG. 4. On the other hand, an open check valve which is normal to the reverse flow would tend to block the passage of trash or leaves long enough for the leaves to adhere to the face of the valve and to be held in that position by the flow of waste water normal to the plane of the valve.

Separate forward and reverse pumps 22 and 32 are employed instead of a single reversible pump. Sometimes air is trapped in the top of the filter housing 13. If a single reversible pump is employed, the reversal of flow would cause such trapped air to be sucked back into the reversible pump causing the pump to lose its prime. Moreover, continued reverse pumping could create a partial vacuum within the top of the filter housing 13 above the filter media 14 sufficient to collapse the walls of conventional filter tanks.

Although the system 10 disclosed in the drawings would normally be mounted above the water level of the swimming pool, nevertheless if the platform 15 were mounted lower, the "Harts loop" in the waste line 58, as disclosed in FIGS. 1 and 3 would have to be at least as high as the water level.

What is claimed is:

1. A filtration backwash system for a swimming pool including a discharge line and a return line, comprising:
    (a) a filter including a filter media and first and second filter ports on opposite sides of said filter media, said second filter port being in fluid communication with said return line,
    (b) a strainer housing having a strainer member having opposite sides therein and a valve chamber on one side of said strainer member,
    (c) a first strainer port in said strainer housing on the other side of said strainer member in fluid communication with said first filter port,
    (d) a second strainer port in said valve chamber in fluid communication with said pool discharge line,
    (e) a waste line in fluid communication with said valve chamber,
    (f) a substantially vertically disposed discharge port in fluid communication with said waste line and having an upper valve seat,
    (g) a discharge check valve member swingably mounted in said waste line above said discharge port operable only by gravity to close said discharge port, and operable to open said discharge port when the pressure below said valve member is greater than the combined weight of the check valve member and the liquid above said check valve member to permit flow of liquid only from said valve chamber outward through said waste line,
    (h) a movable pressure-actuated valve operable to close said pool discharge line when the pressure within said valve chamber is greater than the pressure within said pool discharge line, and to open said pool discharge line when the pressure in said pool discharge line is greater than the pressure within the valve chamber, and
    (i) reversible pump means for moving liquid in a normal direction through said pool discharge line, said open second strainer port, said strainer member, said first strainer port, said first filter port, said filter media, said second filter port and the return line, and in a reverse direction through the return line, said second filter port, said filter media, said first filter port, said first strainer port, said strainer member and said waste line.

2. The invention according to claim 1 in which said discharge check valve member is a flexible flap valve.

3. The invention according to claim 1 in which said reversible pump means comprises a forward pump in fluid communication between said first strainer port and said first filter port operable to move liquid only in said normal direction, and a reverse pump in said return line operable to move liquid only in said reverse direction, and means for selectively actuating said pumps.

4. The invention according to claim 1 in which said pressure-actuated valve comprises a valve member having a pressure face exposed to the liquid within said valve chamber and a slidable element slidably received within said second strainer port to guide said valve member between operative positions opening and closing said second strainer port.

* * * * *